United States Patent [19]

Rait

[11] Patent Number: 5,186,830
[45] Date of Patent: Feb. 16, 1993

[54] WATER FILTRATION APPARATUS

[76] Inventor: Joseph M. Rait, 1100 Amherst St., Buffalo, N.Y. 14216

[21] Appl. No.: 708,809

[22] Filed: May 31, 1991

Related U.S. Application Data

[63] Continuation-in-part of Ser. No. 522,594, May 14, 1990, abandoned.

[51] Int. Cl.⁵ ............................................. B01D 29/085
[52] U.S. Cl. ..................... 210/232; 210/282; 210/455; 210/469; 210/474; 210/477; 210/489; 210/496; 210/510.1
[58] Field of Search ............... 210/232, 469, 474, 477, 210/497.3, 510.1, 500.1, 502.1, 488, 496, 501, 263, 264, 282, 455, 489

[56] References Cited

U.S. PATENT DOCUMENTS

| | | | |
|---|---|---|---|
| 1,748,654 | 2/1930 | Palmer et al. | 210/510.1 |
| 2,605,902 | 8/1952 | Curtis | 210/510.1 |
| 4,145,291 | 3/1979 | Console et al. | 210/232 |
| 4,774,058 | 9/1988 | Mehl | 210/497.3 |

Primary Examiner—Robert A. Dawson
Assistant Examiner—W. L. Millard
Attorney, Agent, or Firm—E. Herbert Liss

[57] ABSTRACT

Abstract for filtering drinking water which includes a lower non-porous container to receive the filtrate. An upper filter vessel closed at its lower end by a high density ceramic filter is stacked in nested relationship to the lower container. When water containing contaminants and pollutants is poured into the filter vessel, it drips through the ceramic filter under gravitational forces and is stored in the lower receptacle.

4 Claims, 2 Drawing Sheets

WATER FILTRATION APPARATUS

This is a continuation in part of copending Ser. No. 07/522,594 filed on May 14, 1990, now abandoned.

FIELD OF THE INVENTION

This invention relates to water filtration apparatus for the removal of pollutants and contaminants in drinking water and, more particularly, with filtration apparatus utilizing a ceramic filter element of a microporous material, through which water passes by force of gravity.

BACKGROUND OF THE INVENTION

In recent years, concern over the quality of drinking water in the United States and elsewhere has stimulated the need for development of drinking water purification in the home and workplace.

The popularity of recreational vehicles and other outdoor recreational activities in areas where municipal water treatment facilities are not available has inspired a demand for portable water purification devices. In many places, homes do not have a purified water source and must rely upon wells or other natural sources which require treatment to provide safe, clean, palatable water. Chlorine added to water to render it bacteriologically safe produces distasteful odor and an undesirable taste.

Filtration systems for home use have been devised which utilize cartridges. The cartridges are elongated cylinders closed at one end by a domed shaped formation. The cartridges are contained in a vessel with an inlet which communicate with the vessel externally of the cartridge and the outlet communicates with the open end of the cartridge. The cartridges are of various porous materials.

The inlet and outlet are connected in series with the water line and the water pressure drives the water through the porous material to the outlet. These must be installed into the source water line and require in line pressure.

A proper in line filter can remove harmful and distasteful contaminants but requires a plumbing installation and is not useful in field or traveling situations. Ceramic cartridge filters are expensive and difficult to clean and maintain.

The gravity filter of the present invention provides a water treatment system which can be utilized in situations where present filtration devices are inconvenient or impractical; it satisfies certain needs not covered by known systems and provides an economical alternative.

The intersticial spaces between in particles of which an integrally molded filter element of high density ceramic incorporating carbon and silver salts averages about two microns. It takes about four to five hours for two quarts of water to pass through such an element.

Increased flow may be achieved by stacking a ceramic filter element incorporating silver salts and a carbon filter element impregnated with calcium carbonate together to form a filter unit. The stacked elements reduce the time to pass two quarts of water through the filter unit to approximately twenty to thirty minutes. This is accomplished by eliminating the carbon in the ceramic element. The interstices in the ceramic element are increased in size to between five and eight microns. The flow rate through the calcium carbonate impregnated carbon element is approximately the same as through the ceramic element of this embodiment. Thus the flow rate is multiplied by ten relative to the single layer filter element.

If the effectiveness of each layer is reduced to ninety percent in order to increase the flow rate, then stacked together, ninety nine percent removal would be achieved. It should be noted that the silver in effect sterilizes the bacteria. The carbon eliminates the chlorine taste. The calcium carbonate eliminates distasteful minerals and replaces a portion of the removed minerals with the more desirable tasting calcium. It has been determined that a ph rating of 7.2 produces the most palatable taste in water for drinking coffee etc. The calcium carbonate maintains the ph at 7.2.

It has not been possible to incorporate ion exchange resins into integrally molded filters because they would be burned out during the molding process. Ion exchange resins are known to remove inorganic salts as well as heavy metals and their oxides and other undesirable impurities. They are known to coagulate particles in the water supply to make them more suitable for filtration and to convert soluble contaminants to insoluble precipitates. Beads of ion exchange resins can be sandwiched between the stacked filter elements. Manganese dioxide may be used to perform the function of the ion exchange resins and can be incorporated in the carbon element.

SUMMARY OF THE INVENTION

The present invention utilizes a pair of stacked containers; the upper container being closed at its lower end by a broad, flat surfaced microporous fixed ceramic filter element. The lower container serves as a receptor for the filtered water. The ceramic may be impregnated with materials which effectively coagulate particles in the water supply to make them more suitable for filtration and others convert soluble contaminants to insoluble precipitates.

A preferred embodiment of the invention comprises a ceramic filter element incorporating silver salts stacked on a carbon element including calcium carbonate with beads of ion exchange resins sandwiched between them.

An embodiment of the invention includes a prefilter stage which removes larger particles to prolong the effectiveness of the ceramic filter between cleanings.

The principle object of the present invention is to provide readily portable, economical drinking water filtering apparatus which can be used in the home or for camping and other outdoor activities.

Another object of the invention is to provide a portable, economical drinking water filter which is capable of removing microscopic pollutants and contaminants while avoiding plumbing connections and utilizing gravitational force to pass the water through the filter.

Yet another object of the invention is to provide a re-cleanable portable filter with a pre-filtering stage for extending the time between needed cleaning.

Another object of the invention is to provide an improved portable, economical drinking water filter capable of removing microscopic pollutants and contaminants, avoiding plumbing connections, improving taste and palatability of the water and improving the flow rate through the filter.

Other objects and advantages of the invention will be apparent from the following detailed description taken in connection with the accompanying drawing in which.

DETAILED DESCRIPTION

Figure 1:
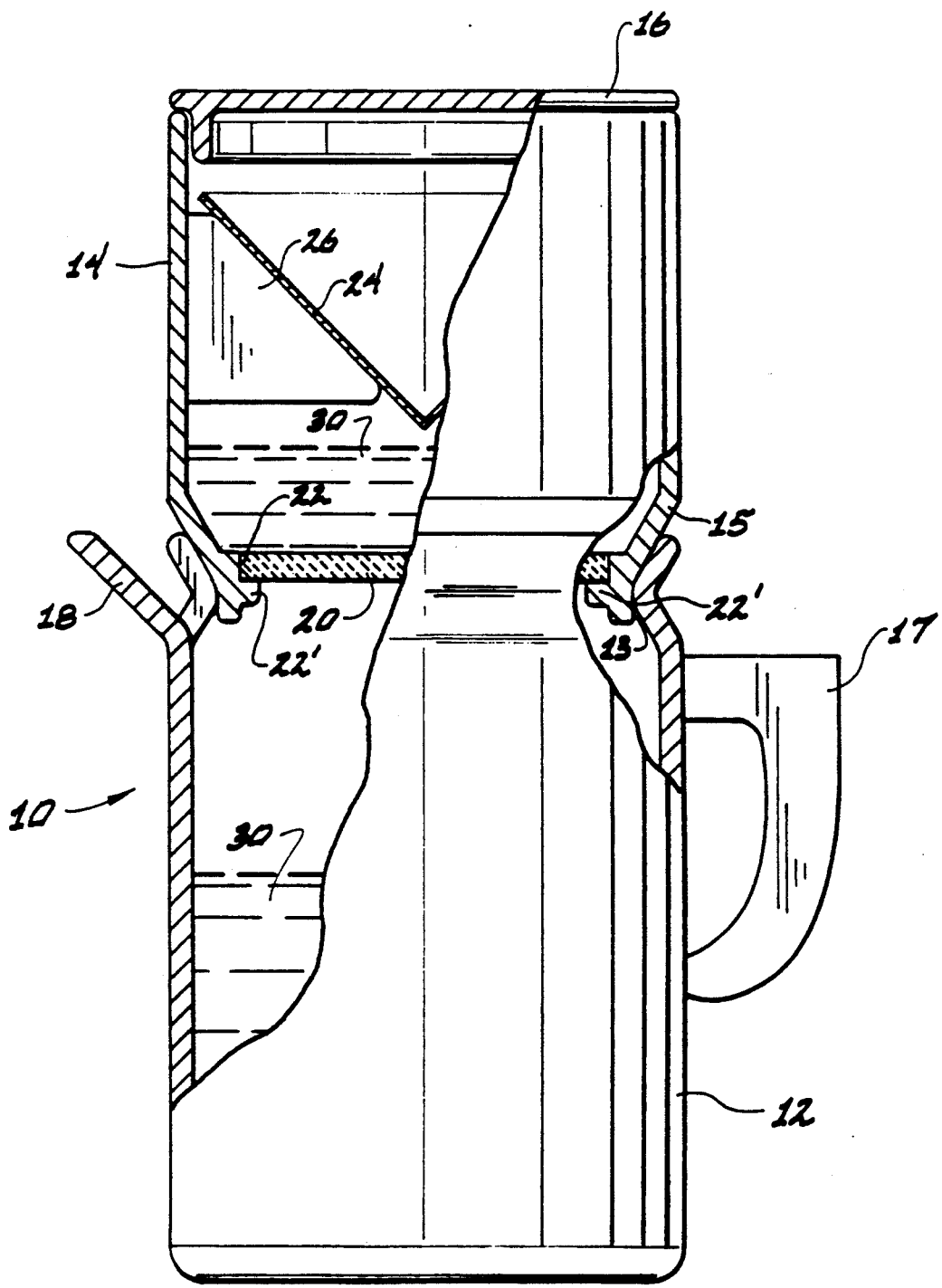
FIG. 1 is a broken away view of the water filtration apparatus of this invention is shown partly in section.

Portable water filtration apparatus 10 includes a pair of vertically stacked vessels including a lower receiving vessel 12 and an upper filtering vessel 14. The vessels 12 and 14 are stacked in nested relationship; they may be of glass, plastic or other suitable or desirable non-porous materials. A lid 16 may be provided for the upper vessel.

The lower vessel 12 may be of cylindrical shape or other suitable or desirable shape open at its top and may include a handle 17 and a spout 18. The periphery of the open top end conforms in shape to the lower end of the upper filtering container 14 in order to accommodate the upper container in nesting relationship.

The upper filtering container 14 is closed at its lower end by a microporous, fired ceramic disk-shaped element 20. The disk is preferably provided with sealing means for preventing leakage at its periphery, as for example, by a press-fit as shown at 22, by application of sealing material such as silicone, for example; other suitable and desirable sealing means which will prevent seepage of water around the edge of the filter may be employed. A lip such as 22' may also be provided. At its lower end, the circumference of the periphery is reduced as at 13 to form a shoulder 15 for supporting container 14 in nested position on container 12.

In a modification of the invention, the upper filtering vessel may be provided with a filter 24 of paper or other fibrous material positioned above the ceramic filter to provide pre-filtering means for preventing larger particles from reaching the ceramic filter. By way of example, the filter 24 may be supported in spaced relationship to the side walls of upper container 14 by ribs 26 sloping inwardly and downwardly to define a conical surface as shown. However, any suitable or desirable filter supporting means may be employed. Such ribs 26 may support a conical paper filter 24 as shown. A preliminary paper filtering means 24 prevents clogging of the ceramic filter 20 by the larger particles of contaminant and thus extends the time between required cleaning.

One or both of the ceramic filters 20 and the preliminary filtering means 24 may be impregnated with materials or chemicals which serve to filter bacteria and other pollutants and/or which may convert soluble contaminants to harmless salts or to coagulate them so as to be filterable. Although the preliminary filtering means 24 is illustrated as paper, other suitable and expedient materials may be used which are sufficiently inexpensive as to be considered expendable.

To prevent ambient particles such as dust, pollen, leaves, etc., from dropping into the water while it is in the upper filtering container, the lid 16, as shown, may be provided.

In use, the filter apparatus 10 is assembled with upper container 14 nested in lower container or receptor 12. The water 30 to be filtered is poured into the upper container 14, whereupon the lid 16 is placed in position to prevent further contamination of the water. Gravity filtration through a fixed porous ceramic filter capable of filtering particles 1 micron or less is not known before the present invention because the time for water to pass through such a filter appeared to be unduly long and thus not a practical method. However, the broad surface of the element coupled with a relatively high head of water brings the filtration time within a useful time span for private, family or individual use. For commercial use, the parameters of surface area and water height must be multiplied to meet requirements.

To accelerate the collection of filtered water, it may be desirable to refill the filtering container 14 in order to maintain a tall head of water and to increase the pressure on the filter.

After a length of time, the filter 20 may become saturated with filtered particles. Most will remain at or near the upper surface. When the collection of filtrate slows down materially, the surface of the filter 20 can be cleaned and recleaned from time to time with a stiff brush. The intervals between cleanings depend largely upon the quality of the water used and the amount of contaminant in the water.

If a pre-filter 24 is used, the time between required cleanings will be substantially increased.

Figure 2:
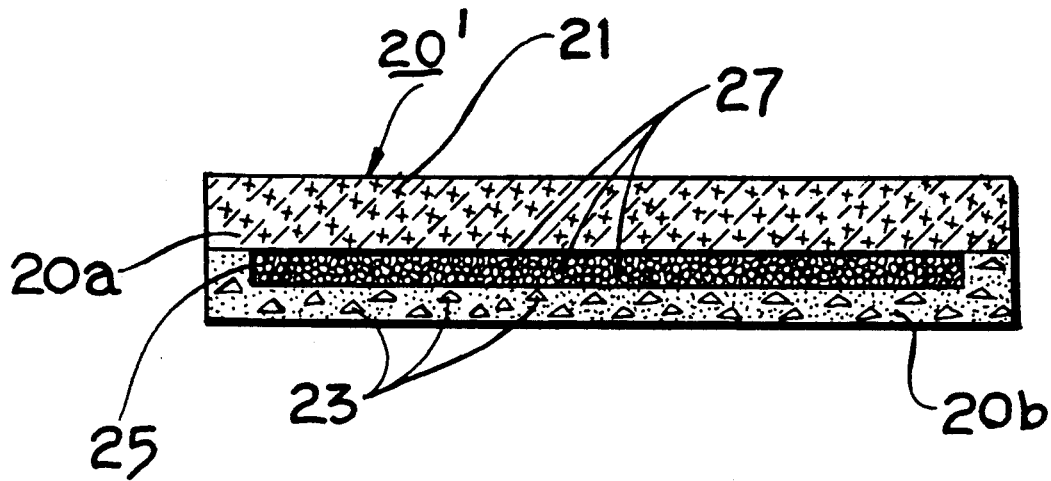
FIG. 2 is a section view of a filter unit of a preferred embodiment.

The filter unit 20 illustrated in FIG. 2 comprises a molded element 20a of relatively high density ceramic incorporating silver salts 21. The space between particles averages approximately 5 to 8 microns. The flow rate of water through the ceramic element 20a is approximately two quarts in twenty to thirty minutes. The ceramic element 20a overlies in juxtaposition a carbon element 20b incorporating calcium carbonate 23. The carbon element 20b is preferably extruded and then cut to the appropriate thickness. It will of course be understood that although the element 20a described herein is extruded, it may be formed by molding or other suitable or desirable means. Formed in its upper surface (as viewed in FIG. 2) 25 adjacent ceramic element 20a is a shallow recess 25. Beads 27 of ion exchange resins are contained in recess 25 and thereby trapped between filter elements 20a and 20b. The flow rate through carbon element 20b is approximately the same as through ceramic element 20a.

Although illustrated and described as a circular disk it will of course be understood that filter unit 20 may be of any suitable or desirable peripheral configuration conforming to the vessel in which it is used.

The filter unit 20 may be installed in the upper filtering container in the same manner as the integrally formed filter element 20 as by a press fit for example. Sealing means such as silicon or other sealing materials may be provided at the periphery to prevent leakage of unfiltered water.

Figure 3:
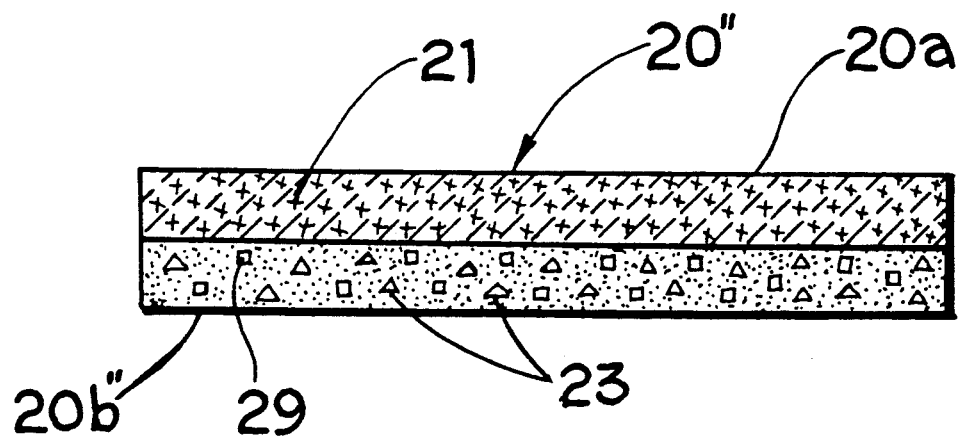
FIG. 3 is a section view illustrating a modification of the filter unit FIG. 2.

Another modification shown in FIG. 3, is a stacked disk filter unit 20" similar to the FIG. 2 modification differing only in the incorporation of manganese dioxide in the carbon element 20b", omission of the recess 25 and beads of ion exchange resins. The manganese dioxide performs the functions of ion exchange resins for filtration purposes and can be incorporated in the carbon element 20b". It is important however to remove the static charges on the manganese dioxide which build up during the milling process. The ceramic element 20a is identical to the element 20a.

A unique application of a fired ceramic filter capable of filtering particles of one micron or less has been shown and described. It is recleanable, economical and readily portable. Although a certain specific embodiment and modification thereof has been shown and described for purposes of illustration, it will, of course, be understood that other and various embodiments and modifications are possible within the scope of the invention. For example, the containers may be of plastic, glass or other nonporous materials. The containers may be of other and different shapes and sizes and the paper filter may be of truncated or cylindrical shape or flat.

Therefore, it should be apparent that the invention is not limited to the embodiments and modifications which come within the scope of the invention.

What is claimed is:

1. Apparatus for filtering water to eliminate contaminants comprising in combination a pair of vertically stacked containers including an upper filtering vessel and a lower receptacle in nested relationship, said upper filtering vessel being closed at its lower end by a microporous filter unit, said microporous filtering unit comprising a fired ceramic filter element incorporating silver salts and overlying in juxtaposition a carbon filter element, and a plurality of beads of ion exchange resins positioned between the said filter elements.

2. A filter unit according to claim 1 wherein said carbon element includes calcium carbonate.

3. A filter unit according to claim 1 wherein said carbon element includes a recess in its surface adjacent said ceramic element, said beads of ion exchange resins being contained in said recess.

4. A filter unit according to claim 1 wherein said carbon element contains manganese dioxide.

* * * * *